US009961882B2

(12) United States Patent
Woods (10) Patent No.: US 9,961,882 B2
(45) Date of Patent: May 8, 2018

(54) RETRACTABLE SNAP-ON LEASH (71) Applicant: Byron Woods, Eastvale, CA (US)

(72) Inventor: Byron Woods, Eastvale, CA (US)

(*) Notice: Subject to any disclaimer, the term of this patent is extended or adjusted under 35 U.S.C. 154(b) by 214 days.

(21) Appl. No.: 15/192,266

(22) Filed: Jun. 24, 2016

(65) Prior Publication Data

US 2017/0000089 A1 Jan. 5, 2017

Related U.S. Application Data (60) Provisional application No. 62/186,582, filed on Jun. 30, 2015.

(51) Int. Cl.
*A01K 27/00* (2006.01)
*A01K 29/00* (2006.01)
*H02J 7/32* (2006.01)

(52) U.S. Cl.
CPC .......... *A01K 27/004* (2013.01); *A01K 27/005* (2013.01); *A01K 27/006* (2013.01); *A01K 27/009* (2013.01); *A01K 29/005* (2013.01); *H02J 7/32* (2013.01)

(58) Field of Classification Search
CPC ... A01K 27/004; A01K 27/003; A01K 27/005
USPC ......................................................... 119/794
See application file for complete search history.

(56) References Cited

U.S. PATENT DOCUMENTS

| 870,784 | A | 11/1907 | Huff |
| D124,073 | S | 10/1940 | Gottlieb |
| 3,250,253 | A | 5/1966 | Galin |
| 4,197,817 | A | 4/1980 | Crutchfield |
| 4,328,766 | A | 5/1982 | Deibert |
| 4,328,767 | A | 5/1982 | Peterson |
| 4,964,370 | A | 10/1990 | Peterson |
| 5,233,942 | A | 8/1993 | Cooper et al. |
| 6,581,547 | B1 | 6/2003 | Austin |
| 7,150,247 | B2 | 12/2006 | Eulette et al. |
| D685,144 | S | 6/2013 | Etheredge |
| 2010/0162966 | A1* | 7/2010 | McFarland .......... A01K 27/004 119/794 |

* cited by examiner

*Primary Examiner* — Monica L Williams
(74) *Attorney, Agent, or Firm* — Kirk A. Buhler; Buhler & Associates (57) ABSTRACT

Improvements in a retractable Snap-On Leash is disclosed. The Snap-on Leash is always on the collar and can be used on nearly any collar that is available in the market place. This further allows the retractable snap-on leash to be removed and placed on a different collar when as the animal grows and when the collar wears out or is damaged. The owner simply needs to locate the handle to extend the leash. A lanyard retainer, stop or lock can be incorporated to limit the extension length less than the length of the leash spooled in the housing. The retracting mechanism allows the leash to be retracted automatically at the end of a walk or as the dog changes distance from the owner. The handle conforms to the shape of the housing to minimize a surface that can catch on anything that the dog might encounter.

20 Claims, 7 Drawing Sheets

RETRACTABLE SNAP-ON LEASH

CROSS REFERENCE TO RELATED APPLICATION

This application claims the benefit of Provisional Application Ser. No. 62/186,582 filed Jun. 30, 2015 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an animal leash. More particularly, the present animal leash is a retractable snap-on leash that allows for the leash to remain on the collar at all times.

Description of Related Art including information disclosed under 37 CFR 1.97 and 1.98

Domesticated animals, such as dogs, require exercise for health. leash laws in most communities are becoming more stringent and more routinely enforced, however, it is becoming less desirable to permit a pet to roam freely and unleashed. As a consequence, walking such pets while they are confined on leashes is becoming increasingly prevalent. The most common leash has a retractable cord that is attached and removed from the collar of a dog when the dog is being walked. The conventional leash and collar combination works well with many animals and in a number of circumstances, it may be inconvenient to use the separate devices in certain circumstances. For example, animal owners frequently do not desire to carry an additional object, thereby limiting their freedom of movement. When not in use, the owner is required to carry the leash, which can be a further inconvenience and the leash may also become lost or misplaced during or before the walk.

A number of patents and or publications have been made to address these issues. Exemplary examples of patents and or publication that try to address this/these problem(s) are identified and discussed below.

U.S. Pat. No. 3,250,253 issued on Jan. 6, 1965 to M. A. Galin discloses a Dog Collar with Retractable Leash. The retractable leash is for use with a domesticated animal for calming the animal in crowded or congested areas. This patent is a collar with an integrated retracting mechanism. The handle is essentially a dowel secured in a sleeve to keep the dowel retained. While this patent is for a retractable dog collar, the consumer must purchase the complete collar and does not have the ability to move the retractor from one collar to another.

U.S. Pat. No. 4,328,766 issued on May 11, 1982 to Daniel T. Deibert discloses a Retracting Collar-Mounted Leash. The casing which is intended to resemble a scaled-down brandy barrel mounts an internal shaft on which is journaled a sleeve which mounts a leaf spring and a coiled leash which extends through a slot in the casing. While this collar can be installed on an existing collar, it lacks a comfortable handle for the user to grip when they walk their dog.

U.S. Pat. No. 7,150,247 issued on Dec. 19, 2006 to Charlotte Eulette et al discloses a Wearable Retracting Animal Leash. The retractable dog leash system is designed to attach to the collar of a pet and be permanently worn in this manner is small and lightweight, and comprises an ergonomic handle that fits neatly against the case when the leash is in a retracted condition. This patent does not have attaching mechanism that wraps around the housing to be more permanently secured where the animal can just rub against a surface to remove the leash.

What is needed is a retractable dog collar where the collar is securable and removable onto an existing dog collar. The retractable snap-on leash disclosed in this document provides the solution.

BRIEF SUMMARY OF THE INVENTION

It is an object of the retractable Snap-On Leash to be installable and removable to an existing collar. This allows the retractable snap-on leash to be used on nearly any collar that is available in the market place. This further allows the retractable snap-on leash to be removed and placed on a different collar when as the animal grows and when the collar wears out or is damaged. It does not restrict the owner from using a particular type, style, width or material of the collar.

It is an object of the retractable Snap-On Leash for the retractable snap-on leash to be nearly permanently installed on the collar. With the retractable snap-on leash installed on the collar of a dog, the owner simply needs to locate the handle to extend the leash. This is particularly useful when the owner believes that the dog is in a safe environment and then finds that they need to rapidly gain control of the dog. If a leash is not installed, then the owner can only grasp the collar where there is a higher potential for the dog to turn and bite.

It is another object of the retractable Snap-On Leash to have a leash. The leash allows the pet owner to walk the dog from a distance. The leash can be available in different lengths to change the maximum distance the dog can move relative to the owner. This creates a safety length where the owner can obtain control of the dog. The retractable snap-on leash can have a stop or lock that limits the extension length to a length that is less than the entire length of the leash that is spooled in the housing.

It is another object of the retractable Snap-On Leash to have a retracting mechanism. The retracting mechanism allows the leash to be retracted automatically at the end of a walk or as the dog changes distance from the owner. The retraction mechanism can be either a clock spring, constant force spring or other mechanism that can retract a cord or strap onto a spool within the housing.

It is still another object of the retractable Snap-On Leash to have a handle attached to the end of the leash. When the leash is retracted into the housing, the handle conforms to the shape of the housing to minimize a surface that can catch on anything that the dog might encounter.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
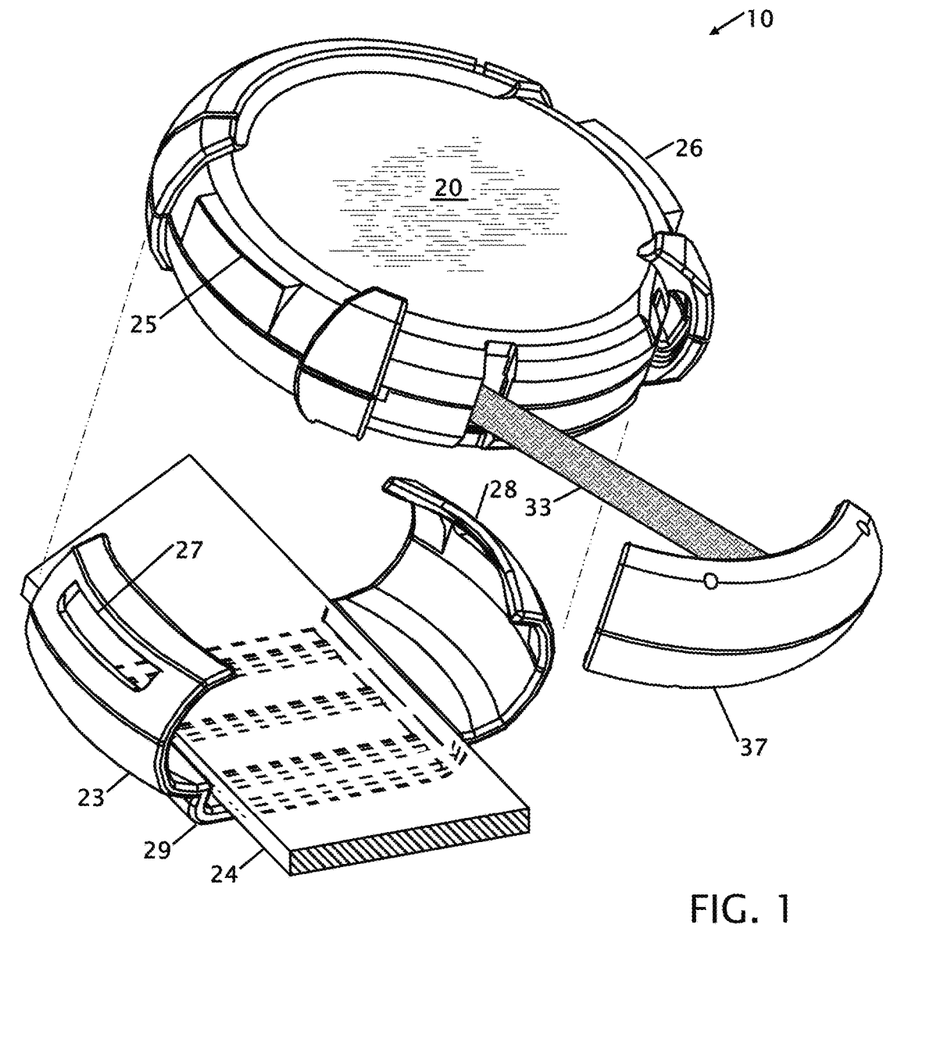
FIG. 1 shows the retractable snap-on leash with the retainer displaced from the retraction component and the lanyard partially extended.

FIG. 1 shows the retractable snap-on leash 10 with the retainer 23 displaced from the retraction component and the lanyard 33 partially extended. The snap-on leash 10 snaps onto a collar 24 and wraps around the housing 20 that retains the lanyard 33 and the retracting mechanism. The housing essentially has a toroidal shape where the retainer extends at least partially around opposing sides of the housing. The retainer locks onto the housing with side tabs that wrap around the housing 20 and tabs 25 and 26 are retained in openings 27 and 28. There is clearance in the bottom 29 of the retainer 23 to provide clearance for the collar 24 to freely pass to allow the snap-on leash 10 to freely slide and move along the collar 24. This allows the snap-on leash 10 to slide to the bottom of the collar 24 when it is not being used and also to slide around the top of the collar 24 when the snap-on leash 10 is being used. The retention is with flexible sides that locks the retainer 23 onto the housing 20 and also leaves a clearance in the retainer 23 with the collar for the housing to slide or move on the collar.

To remove the snap-on leash 10 from the collar 24, the wings of the retainer 23 are spread to allow one or more of the tabs 25 and/or 26 to clear the opening(s) 27 and 28. This configuration of the retainer 23 allows the retractable snap-on leash 10 to be installed and removed from a collar without requiring the collar to be removed from around the neck of a dog. This is especially useful to quickly connect the retractable snap-on leash 10 to a dog without losing control of the collar of the dog.

Inside the snap-on leash 10 is a retraction mechanism allows the leash to be retracted automatically at the end of a walk or as the dog changes distance from the owner. The retraction mechanism can be either a clock spring, constant force spring or other mechanism that can retract a cord, strap or lanyard 33 onto a spool within the housing 20. At the end of the lanyard 33 a strap retainer 37 or handle provides comfort for the person giving the dog a walk.

Figure 2:
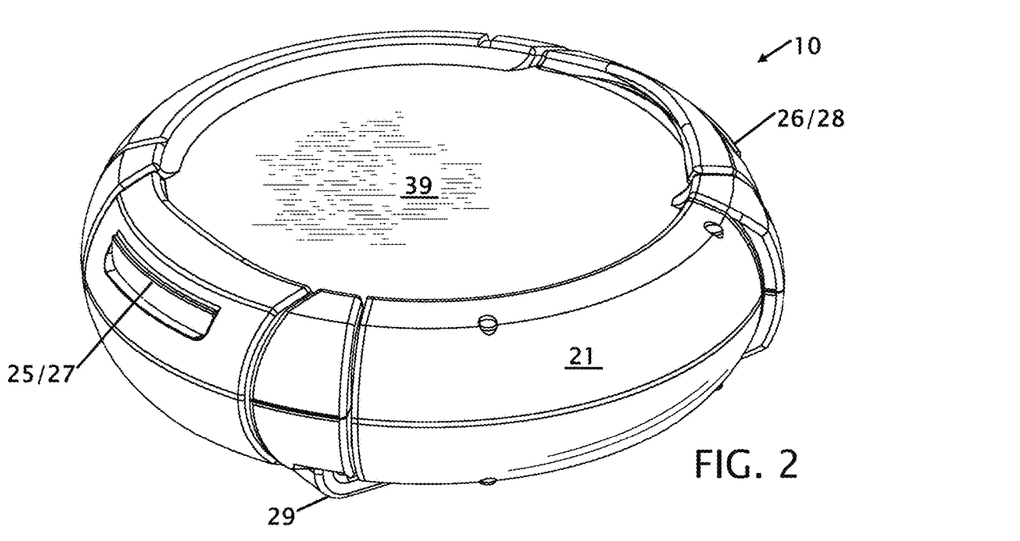
FIG. 2 shows a top perspective view of the retractable snap-on leash.
Figure 3:
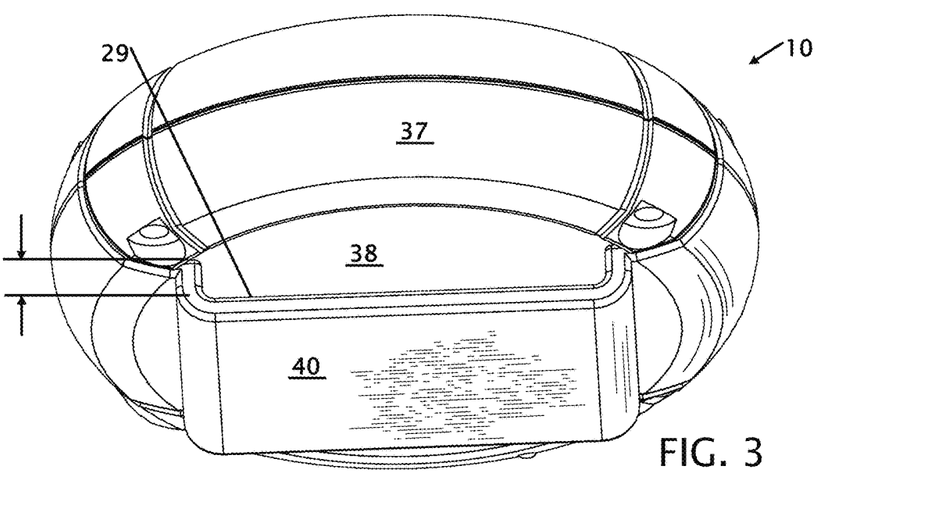
FIG. 3 shows a bottom perspective view of the retractable snap-on leash.

FIG. 2 shows a top perspective view of the retractable snap-on leash 10 and FIG. 3 shows a bottom perspective view of the retractable snap-on leash 10. These figures show the top housing 39 and the bottom housing 38 with the clip 40 secured to wrap around the bottom housing 38 and the top housing 39. This not only secures the retractable snap-on leash 10 to the collar (not shown in this figure) and also helps retain the top and bottom housings together. The retainer clip 40 is shown with the tabs 25 and 26 are retained in openings 27 and 28. The retainer clip 40 shows a gap 29 where the collar can freely slid and move. It is further contemplated that the outer surface of the top housing 39 could include indicia like the name, address and contact phone number of the dog/owner.

Figure 4:
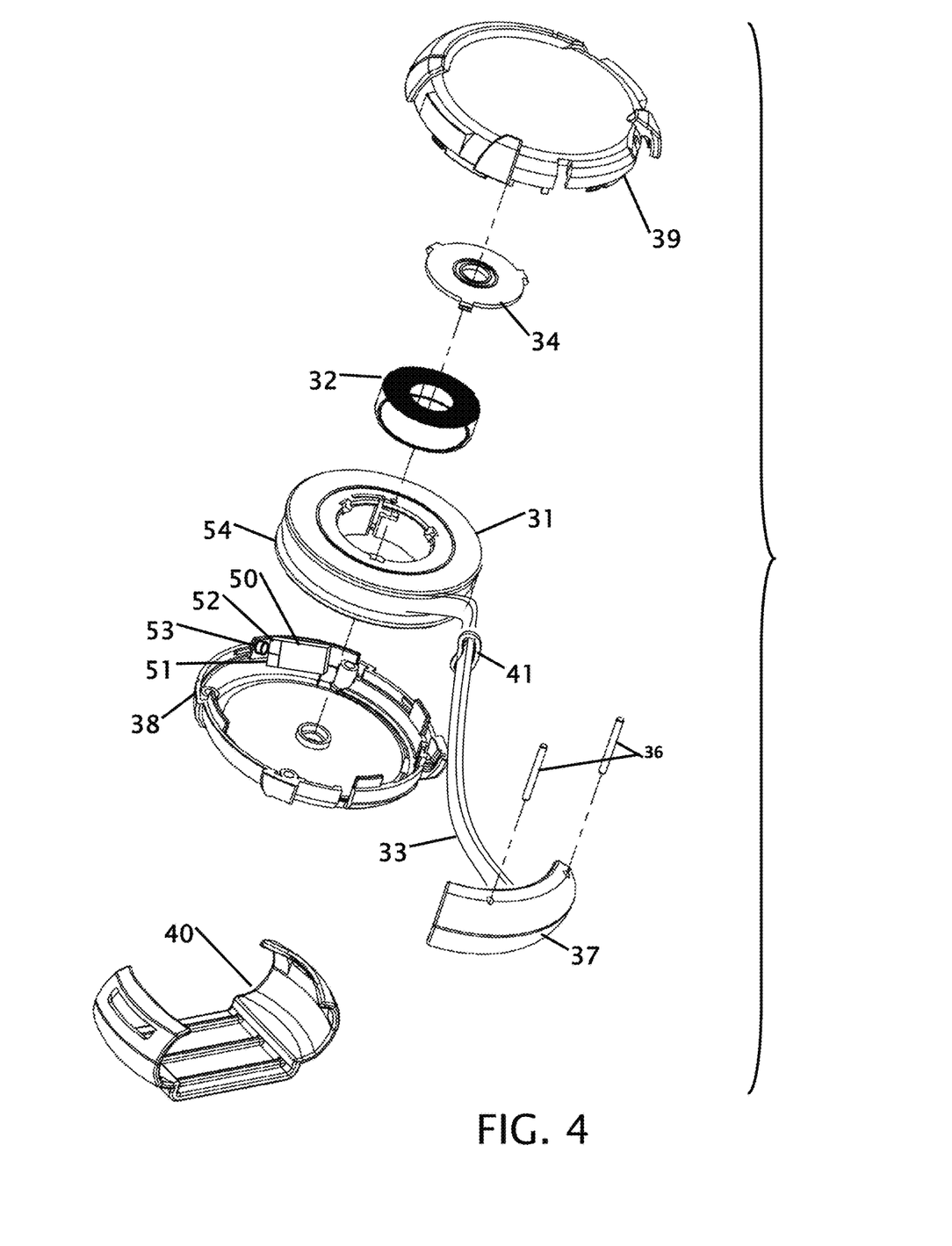
FIG. 4 shows an exploded view of the retractable snap-on leash.

Relationship Between the Components:

FIG. 4 shows an exploded view of the retractable snap-on leash 10. The retractable snap-on leash 10 is attachable to any collar with durable snapping devices that maintains the retractable snap-on leash 10 on the collar of an animal. The retractable snap-on leash 10 is designed to retractable the cord when desire to walk your animals. The lanyard includes a handle to grab the leash in the hand of the owner.

How the Retractable Snap-on Leash Works:

Handle part strap retainer 37 is attached to Snap-on leash which retracts into the top 39 and bottom housing 38 when not being used when walking animals. A pre-existing dog collar of nearly any style passes through the clearance in the clip 40. However, the Snap-on leash attaches to any existing animal's collar. The leash is retractable and remain on collar at all times. The retainer has a strong snapping mechanisms that maintains the retractable snap-on leash 10 on the collar of an animal. The lanyard is shown as a flat ribbon, but can be a string, cord or other lanyard 33. The lanyard 33 is retractable into collar where the lanyard 33 winds onto a spool 31.

The winding is with a power spring 32. The power spring 32 can be either a clock spring, constant force spring or other mechanism that can retract a cord, strap or lanyard 33 onto a spool 31 within the housings 38 and 39. A spring cover 34 holds the coils of the power spring 32 in concentric alignment. A lanyard retainer 41 cushions the strap retainer 37 when it retracts into the housing and also allows the user to fix the amount of the lanyard that is static outside of the housing. A pair of pins 36 retains the lanyard 33 onto the strap retainer 37.

Because the retractable snap-on leash 10 is removable, it may include internal batteries 50 that can be charged to power an illumination device such as lights 53 that illuminate the ground as the dog and person walk. The lights 53 can be activated when the handle 37 is retracted and when a light sensor detects that it is dark. Batteries 50 can also power a tracking device such as used with Global Positioning Satellites 52 (GPS) to identify the location of the dog if it becomes lost and a transmitter to transmit the location of the dog. It is further contemplated that the spool 31 include magnets 54 with a pick-up coil 51 whereby pulling and retracting the lanyard 33 generates electricity to charge the battery 50.

How to Make the Retractable Snap-on Leash:

A leash is combined with the snap-on device that has a retractable device and locks in place when not being used. The retractable leash deploys when in use. The snap-on leash can fit any existing collar with durable snaps.

The leash, snap-on devices, materials to make Snap-On leash to fit tight around any collar. An integrated and retractable handle allows a person to hold when walking an animal. It is contemplated that the lanyard can have more than one retractable cords with different strengths that can be changed. A light weight lanyard would be longer and would work with small dogs, while a heavier duty lanyard would be shorter and work with larger dogs when walking animals of larger/heavier weights.

How to Use the Retractable Snap-on Leash:

Because the retractable snap-on leash is designed to operate with an existing collar with a leash attached to their collar, it eliminates the need for a person to purchase a collar and a leash separately it further allows a person to purchase just the retractable snap-on leash for use with an existing collar.

Figure 5:
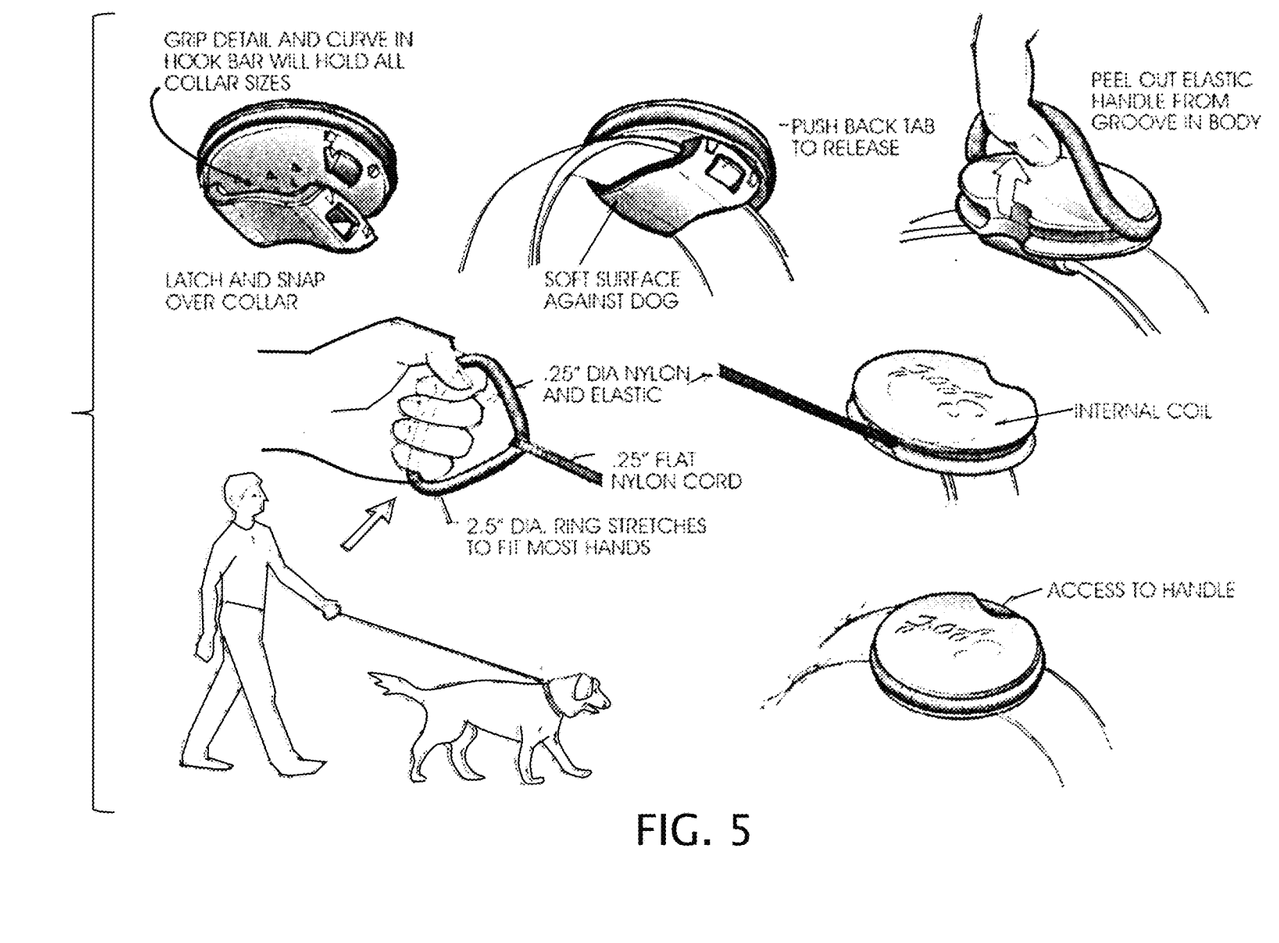
FIG. 5 shows a second contemplated embodiment.
Figure 6:
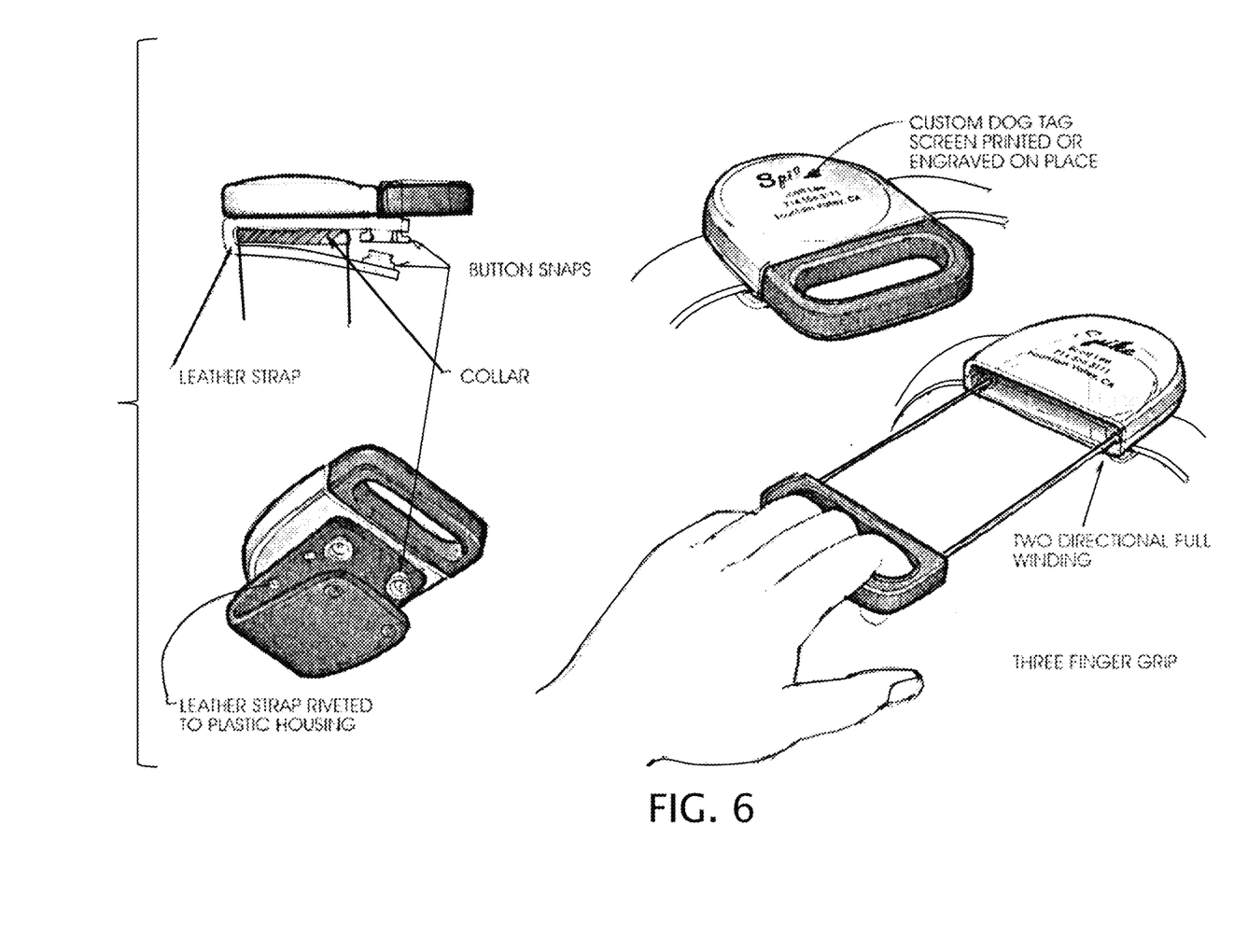
FIG. 6 shows a third contemplated embodiment.
Figure 7:
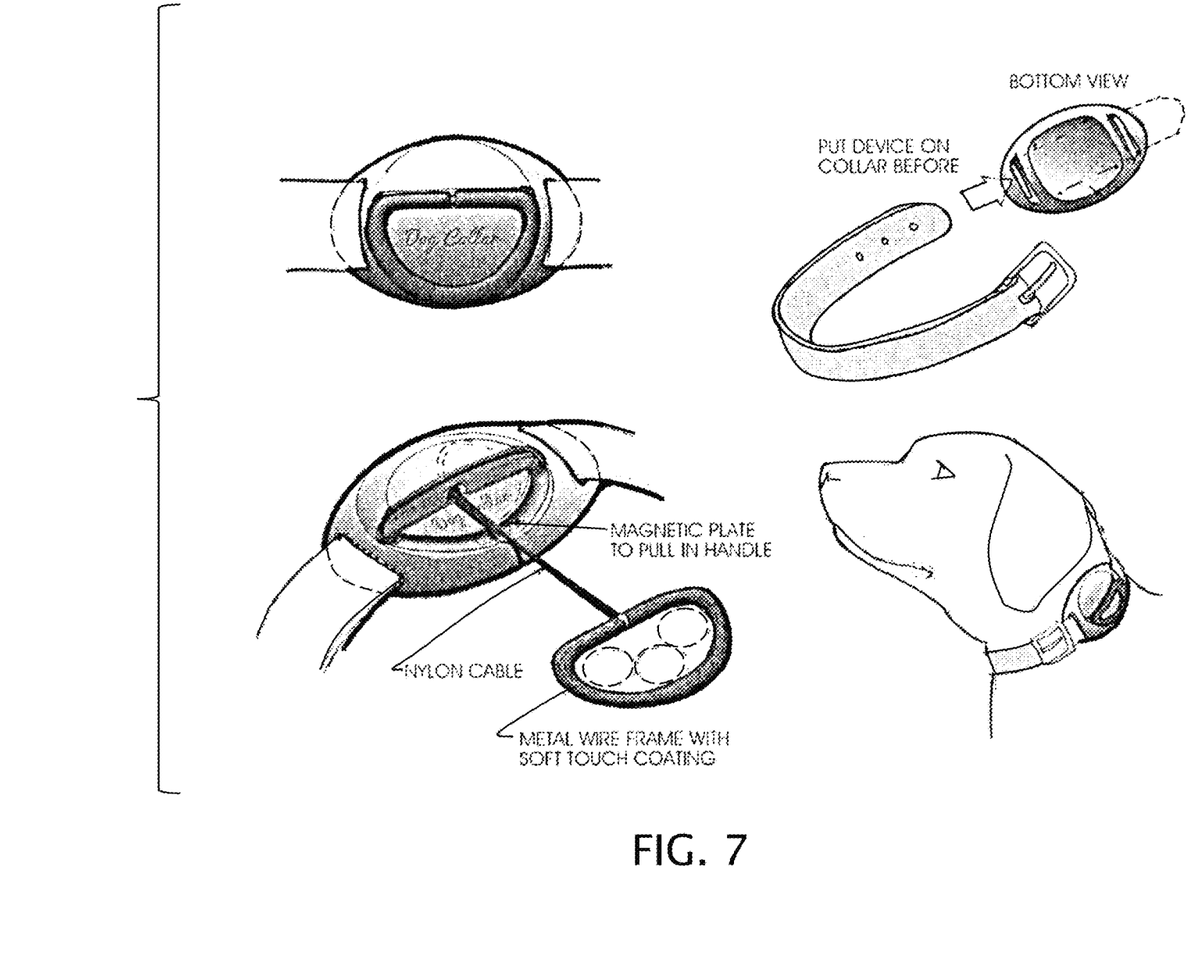
FIG. 7 shows a fourth contemplated embodiment.
Figure 8:
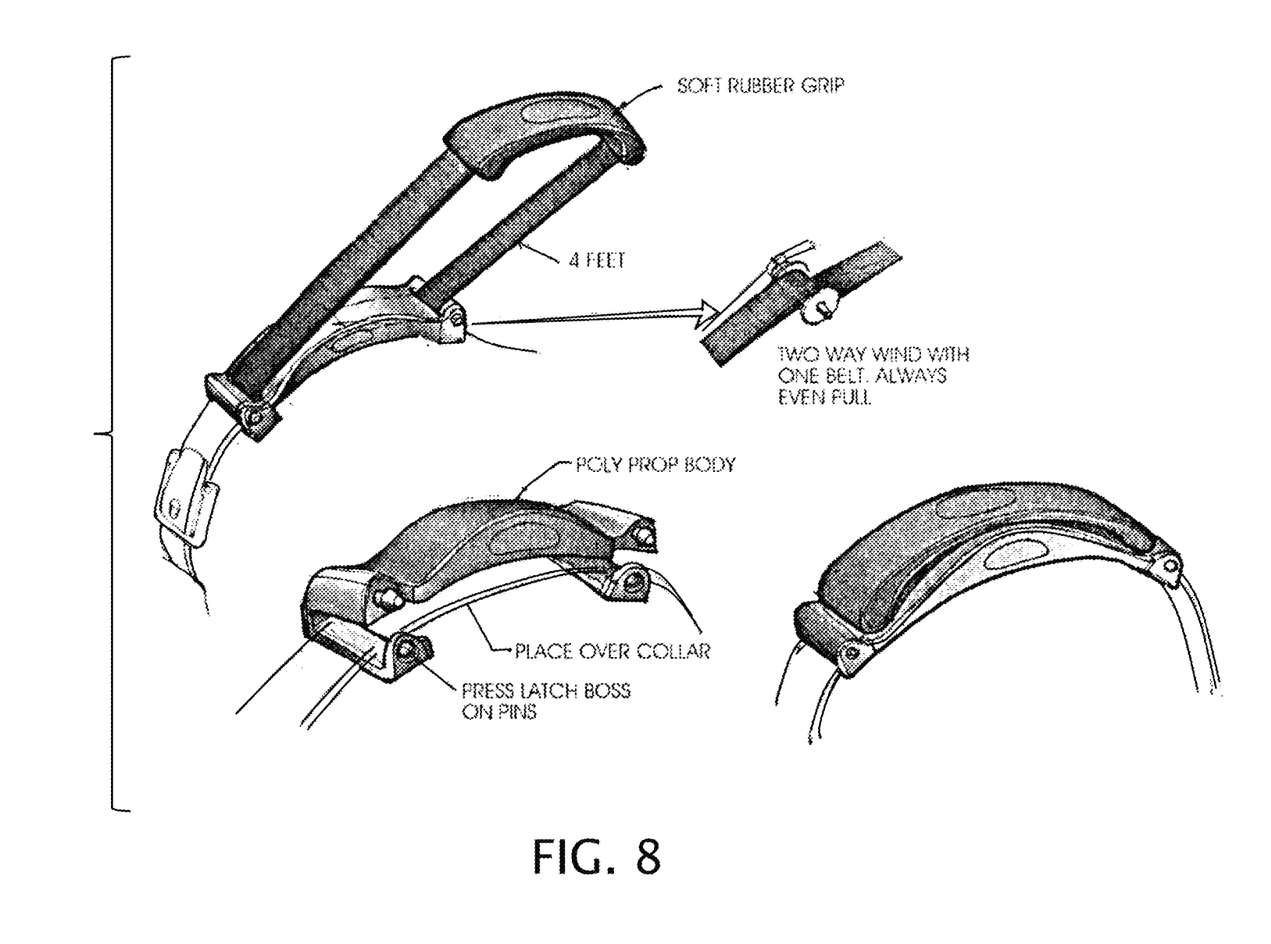
FIG. 8 shows a fifth contemplated embodiment.

FIG. 5 shows a second contemplated embodiment, FIG. 6 shows a third contemplated embodiment, FIG. 7 shows a fourth contemplated embodiment and FIG. 8 shows a fifth contemplated embodiment.

Thus, specific embodiments of a snap-on leash have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A retractable snap-on leash comprising:
a housing having a top housing and a bottom housing;
a retainer that is separate and separable from said top housing and said bottom housing;
said top housing having at least two protrusions existing on opposing sides of said top housing;
said retainer having at least two openings existing on opposite sides of said top housing configured to temporally engage in said at least two protrusions in said top housing whereby said bottom housing is secured between said top housing and said retainer;
said retainer further having a gap between said retainer and said bottom housing;
said housing having a coiled power spring secured within said housing at a first end;
a spool secured to a second end of said coiled power spring;
said spool having a first end of a lanyard secured therein;
said lanyard having a second end secured to a handle that exists outside of said housing;
said lanyard passing through a lanyard retainer, and
a collar that is slidably securable within said gap between said retainer and said bottom housing.

2. The retractable snap-on leash according to claim 1 wherein said coiled power spring is a constant force spring or a clock spring.

3. The retractable snap-on leash according to claim 1 wherein said lanyard is replaceable.

4. The retractable snap-on leash according to claim 1 wherein said lanyard is flat or round in cross-section.

5. The retractable snap-on leash according to claim 1 further includes a tracking device.

6. The retractable snap-on leash according to claim 5 further includes a charging connection to charge a battery.

7. The retractable snap-on leash according to claim 5 wherein movement of said spool charges said battery.

8. The retractable snap-on leash according to claim 1 wherein said lanyard retainer is an elastomeric member having a central opening that is smaller is cross section than said lanyard.

9. The retractable snap-on leash according to claim 1 wherein said housing further includes at least one illumination device.

10. The retractable snap-on leash according to claim 1 wherein said retainer is configured to be installed and removed from said housing when said collar is retained on an animal.

11. A retractable snap-on leash comprising:
a toroidal housing;
a retainer that is separate and separable from said housing;
said housing having at least one protrusion on a side of said top housing;
said retainer having at least one opening that keys with said at least one protrusion to temporally engage in said at least one protrusion in said housing and wraps at least partially around said housing;
said retainer further having a gap between said retainer and said housing;
said housing having a coiled power spring secured within said housing at a first end;
a spool secured to a second end of said coiled power spring;
said spool having a first end of a lanyard secured therein, and
said lanyard having a second end secured to a handle that exists outside of said housing.

12. The retractable snap-on leash according to claim 11 wherein said coiled power spring is a constant force spring or a clock spring.

13. The retractable snap-on leash according to claim 11 wherein said lanyard is replaceable.

14. The retractable snap-on leash according to claim 11 wherein said lanyard is flat or round in cross-section.

15. The retractable snap-on leash according to claim 11 further includes a tracking device.

16. The retractable snap-on leash according to claim 15 further includes a charging connection to charge a battery.

17. The retractable snap-on leash according to claim 15 wherein movement of said spool charges said battery.

18. The retractable snap-on leash according to claim 11 further includes a lanyard retainer.

19. The retractable snap-on leash according to claim 11 wherein said housing further includes at least one illumination device.

20. The retractable snap-on leash according to claim 11 wherein said retainer is configured to be installed and removed from said housing when a collar is retained on an animal.

* * * * *